(12) United States Patent
Grimaud

(10) Patent No.: US 6,741,702 B2
(45) Date of Patent: May 25, 2004

(54) DEVICE FOR CONNECTING A SUBSCRIBER LINE TO A HIGH FREQUENCY LINK AND TO A LOW FREQUENCY LINK

(75) Inventor: Jean-Yves Grimaud, Pleumeur Bodou (FR)

(73) Assignee: Alcatel, Paris (FR)

( * ) Notice: Subject to any disclaimer, the term of this patent is extended or adjusted under 35 U.S.C. 154(b) by 425 days.

(21) Appl. No.: 09/973,724

(22) Filed: Oct. 11, 2001

(65) Prior Publication Data

US 2002/0076036 A1 Jun. 20, 2002

(30) Foreign Application Priority Data

Nov. 30, 2000 (FR) .............................. 00 15486

(51) Int. Cl.$^7$ ................................ H04M 9/08
(52) U.S. Cl. ............................ 379/413.01; 379/399.01
(58) Field of Search ............................ 379/45.01, 252, 379/322, 323, 324, 376.02, 382, 399.01, 413, 413.01

(56) References Cited

U.S. PATENT DOCUMENTS 6,144,735 A    11/2000   Bella
2002/0031217 A1 *   3/2002   Kiykioglu .............. 379/399.01

* cited by examiner

Primary Examiner—Minsun Oh Harvey
Assistant Examiner—Jefferey Harold
(74) Attorney, Agent, or Firm—Sughrue Mion, PLLC

(57) ABSTRACT

The invention relates to device for connecting a subscriber line SUB to a high frequency link HF and to a low frequency link BF, the device comprising a transformer TR disposed between said subscriber line SUB and a signaling link SL, the transformer TR comprising a coupling coil CC designed to be fed by an encoder CODEC, the device also comprising a first switch SW1 for injecting either a ringing signal RS or a power supply signal DC into said signaling link SL in response respectively to a first state and a second state of a control signal CS. In addition the device comprises a second switch SW1 for connecting or disconnecting the feed of said coupling coil CC in response respectively to the second and to the first states of said control signal CS.

7 Claims, 1 Drawing Sheet

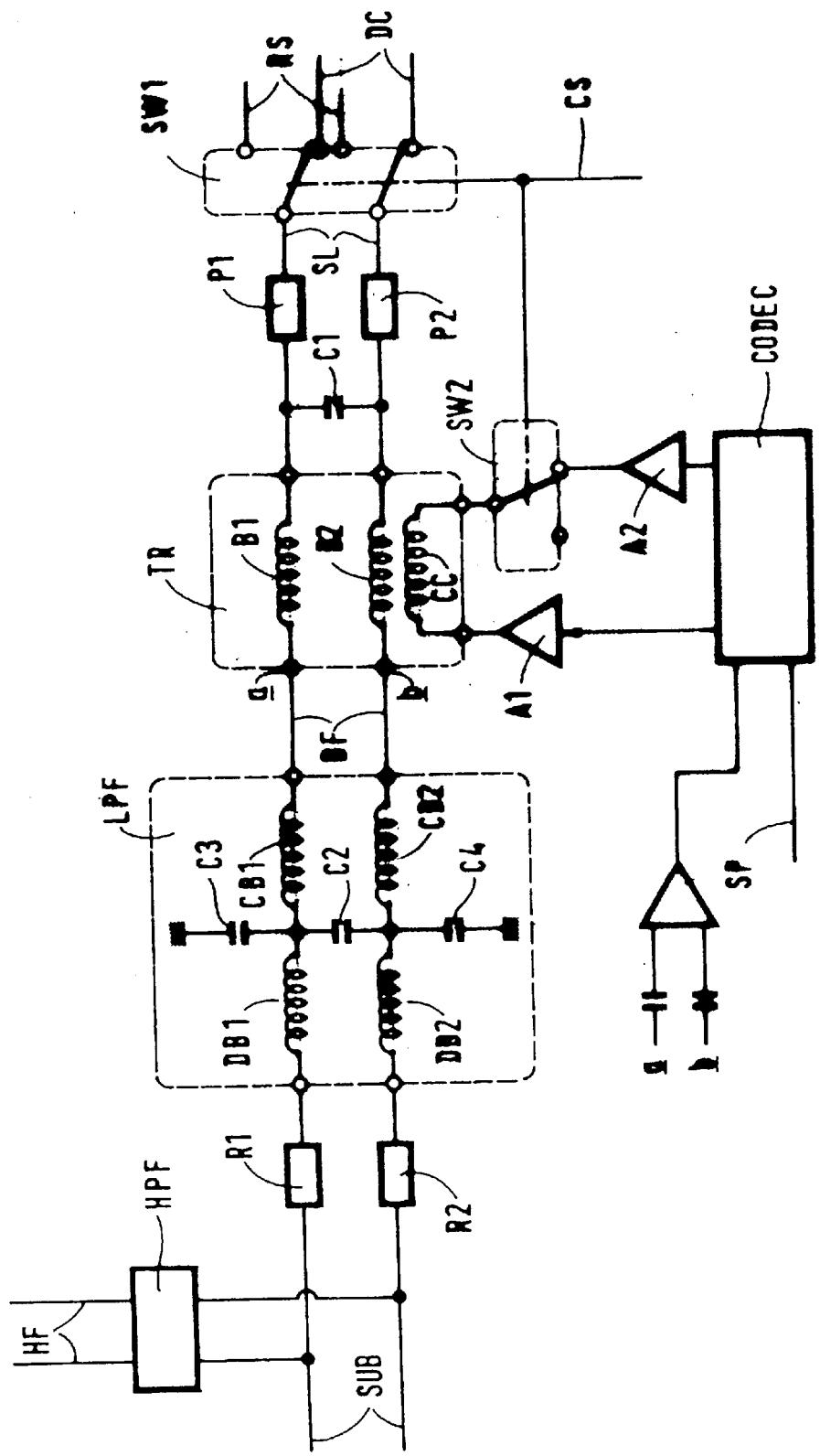

DEVICE FOR CONNECTING A SUBSCRIBER LINE TO A HIGH FREQUENCY LINK AND TO A LOW FREQUENCY LINK

The present invention relates to a device for connecting a subscriber line to a high frequency link and to a low frequency link. The invention is applicable to communications networks, in particular to the public switched telephone network (PSTN).

BACKGROUND OF THE INVENTION

Such a network connects a subscriber to a switching center by means of a line. The subscriber has a telephone set which produces a low frequency signal and the subscriber also has a computer terminal which produces a high frequency signal, both of these two signals being conveyed together over the subscriber line.

In the switching center, the device is provided for connecting the subscriber line to a low frequency link and to a high frequency link which are respectively involved with conveying the low frequency signal and the high frequency signal. Typically, the high frequency link is a digital link with asymmetrical data rates, widely known as the acronym "ADSL" for "asymmetrical digital subscriber line".

Separating the two signals does not raise any particular difficulty, except insofar as the low frequency signal can present interference which overlaps part of the spectrum of the high frequency signal. For example, the ringing signal for the telephone set is carried over the low frequency link and it is indeed a low frequency signal, however it is a pulsed signal and it therefore presents harmonics which constitute interference at high frequency. It is therefore appropriate to provide a lowpass filter function in the connection device to avoid injecting high frequency components from the low frequency link into the high frequency link.

This filtering function is conventionally performed by means of a specific module which requires numerous components.

OBJECTS AND SUMMARY OF THE INVENTION

An object of the present invention is thus to provide a connection device which considerably simplifies implementation of the filtering function.

According to the invention, the device for connecting a subscriber line to a high frequency link and to a low frequency link comprises a transformer disposed between said subscriber line and a signaling link, the transformer comprising a coupling coil designed to be fed by an encoder, the device also comprising a first switch for injecting either a ringing signal or a power supply signal into said signaling link in response respectively to a first state and a second state of a control signal; in addition, the device comprises a second switch for connecting or disconnecting the feed of said coupling coil in response respectively to the second and to the first states of said control signal.

Thus, the transformer performs a coupling function when the control signal is in its second state, and it provides the lowpass filtering function when the control signal is in its first state.

Advantageously, the device includes a lowpass filter disposed between said transformer and the subscriber line.

Thus, the lowpass filter comprises a capacitive element.

Preferably, said lowpass filter comprises a common mode stop coil disposed between said capacitive element and said transformer.

Similarly, it comprises a differential mode stop coil connected between said subscriber line and said capacitive element.

Furthermore, in a preferred embodiment, the device comprises a filter capacitor connected between said transformer and said signaling link.

Preferably, for device comprising a regulation loop having one end connected to the coupling coil, the other end of the regulation loop is connected to the output of the transformer, on the subscriber line side.

BRIEF DESCRIPTION OF THE DRAWING

The invention appears in greater detail below from the following description of embodiments given by way of illustration and made with reference to the sole accompanying FIGURE which is a circuit diagram of the device.

MORE DETAILED DESCRIPTION

The present invention is thus presented in an application to the public switched telephone network.

With reference to the figure, the transformer TR comprises a first coil B1 having one terminal referenced a and having its other terminal connected to a first power resistor P1. The transformer also has a second coil B2 having one terminal referenced b and having its other terminal connected to a second power resistor P2. A two-wire signaling link SL is connected to the ends of the power resistors P1, P2 that are not connected to the transformer TR. This signaling link SL is connected via a first switch SW1 to receive either a ringing signal RS or a direct current power supply signal DC (e.g. at 48 volts) depending respectively on whether a control signal CS for the switch SW1 is in a first state or in a second state.

The transformer TR also has a coupling coil CC with a first terminal powered by a first amplifier A1. In the invention, the second terminal of this coupling coil CC is connected to a second amplifier A2 via a second switch SW2 which is open or closed depending on whether the control signal CS is respectively in its first state or in its second state.

The two amplifiers A1, A2 are powered by a speech encoder CODEC which also receives the signal taken from the terminals a, b of the transformer TR in order to regulate the level thereof.

Thus, when the ringing signal RS is injected, the second switch SW1 is open and the transformer TR which is then decoupled from the encoder CODEC acts as a lowpass filter.

A first capacitor C1 is preferably connected to the ends of the power resistors P1, P2 which are not connected to the signaling link SL.

The device of the invention also comprises a two-port lowpass filter LPF having a first port connected to the terminals a, b of the transformer TR via a low frequency link BF.

The second port of the filter LPF is connected to the subscriber line SUB, preferably via two positive temperature coefficient resistors R1, R2 so as to provide protection against high currents.

The lowpass filter LPF advantageously comprises first and second common mode stop coils CB1 and CB2 whose first terminals are respectively connected to the terminals a, b of the transformer TR. A second capacitor C2 is connected to the second terminals of the two common mode stop coils CB1, CB2. Advantageously, respective third and fourth capacitors C3 and C4 are connected between ground and the respective common points between the second capacitor C2 and the first common mode stop coil CB1 and the second common mode stop coil CB2.

It is also possible to provide first and second differential mode stop coils DB1 and DB2 connected between the second ports and the terminals of the second capacitor C2.

The connection device of the invention also comprises a highpass filter HPF connected between the subscriber line SUB and a high frequency link HF, e.g. connected to an ADSL modulator/demodulator.

The invention is not limited to the embodiments described above. In particular, any means can be replaced by equivalent means.

What is claimed is:

1. A device for connecting a subscriber line to a high frequency link and to a low frequency link, the device comprising a transformer disposed between said subscriber line and a signaling link, the transformer comprising a coupling coil designed to be fed by an encoder, the device also comprising a first switch for injecting either a ringing signal or a power supply signal into said signaling link in response respectively to a first state and a second state of a control signal, the device comprising a second switch for connecting or disconnecting the feed of said coupling coil in response respectively to the second and to the first states of said control signal.

2. A device according to claim 1, including a lowpass filter disposed between said transformer and the subscriber line.

3. A device according to claim 2, wherein said lowpass filter comprises a capacitive element.

4. A device according to claim 3, wherein said lowpass filter comprises a common mode stop coil disposed between said capacitive element and said transformer.

5. A device according to claim 3, wherein said lowpass filter comprises a differential mode stop coil connected between said subscriber line and said capacitive element.

6. A device according to claim 1, comprising a filter capacitor connected between said transformer and said signaling link.

7. A device according to claim 1, comprising a regulation loop having one end connected to said coupling coil and having the other end of said regulation loop connected to the output of said transformer on the subscriber line side.

* * * * *